(No Model.)
E. M. POSTON.
SECONDARY BATTERY.
No. 528,740. Patented Nov. 6, 1894.
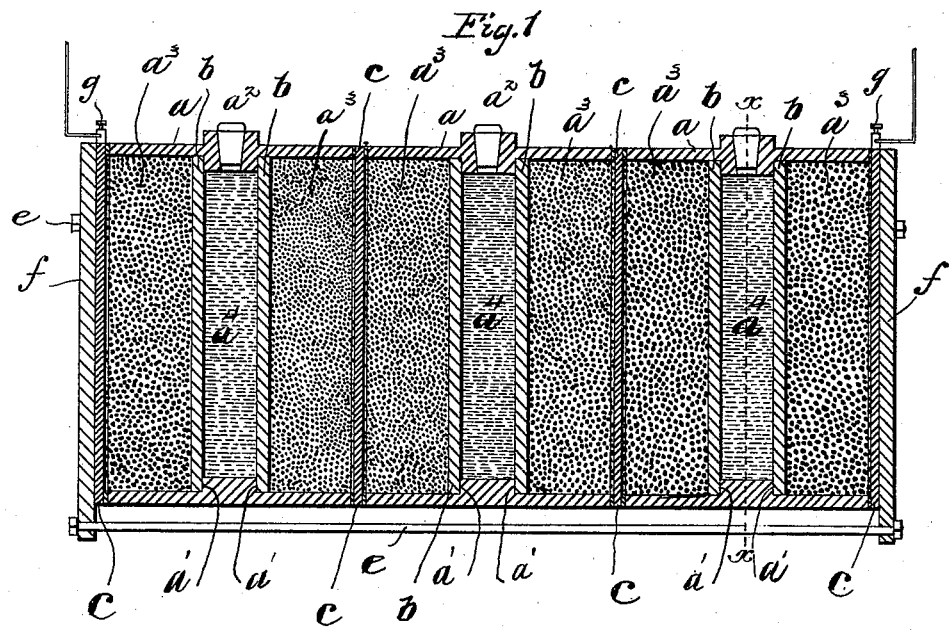
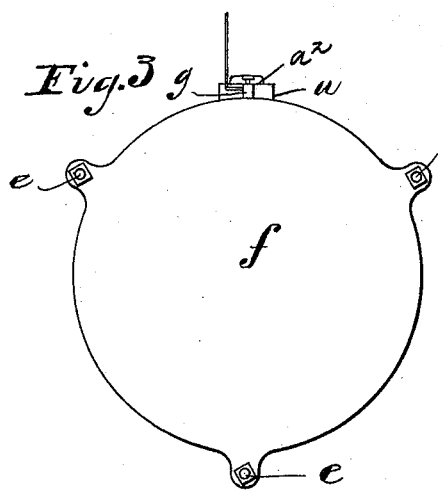
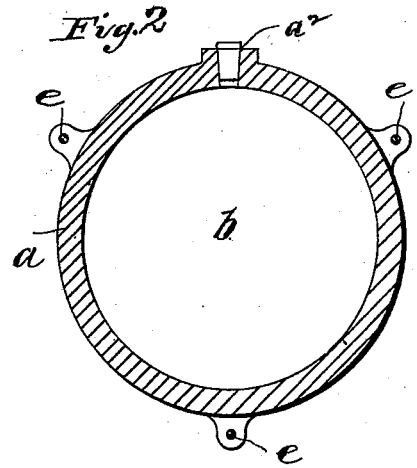
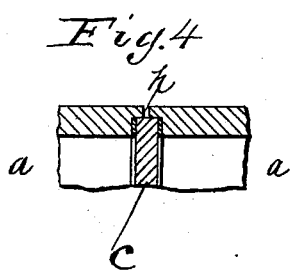
WITNESSES:
H. B. Bradshaw
Chas. I. Welch
INVENTOR
Elias M. Poston
BY
Shepherd
ATTORNEYS

UNITED STATES PATENT OFFICE.

ELIAS M. POSTON, OF SPRINGFIELD, OHIO.

SECONDARY BATTERY.

SPECIFICATION forming part of Letters Patent No. 528,740, dated November 6, 1894.

Application filed January 29, 1894. Serial No. 498,294. (No model.)

*To all whom it may concern:*

Be it known that I, ELIAS M. POSTON, a citizen of the United States, residing at Springfield, in the county of Clark and State of Ohio, have invented certain new and useful Improvements in Storage or Secondary Batteries, of which the following is a specification.

My invention relates to improvements in storage or secondary batteries.

The object of my invention is to simplify the construction of the secondary batteries now in use; the construction being such that any number of elements may be included together in one cell or casing, so that said elements will be in series, thus furnishing the means by which the potential of the battery may be varied at will.

A further object of my invention is to simplify the construction so that the active material is supported within a casing and in contact with a plate, which plate is not a support for said active material, but forms simply a conductor therefor.

A further object of my invention is to so construct the elements which constitute a cell that the conducting plates shall form an electrical connection between the respective elements so that said plates shall constitute a positive pole to one of said elements and a negative pole to the other.

I attain these objects by the constructions shown in the accompanying drawings, in which—

Figure 1 is a sectional elevation of a battery embodying my invention. Fig. 2 is a transverse section of the same on the line $x\,x$ in Fig. 1. Fig. 3 is an end elevation. Fig. 4 is a detail modification.

Like parts are represented by similar letters of reference in the several views.

In the said drawings, $a\,a\,a$ represent sections of a casing, which may be of any desired conformation, round, square or in any other form. These sections $a$, are each formed near the center with a rib or projection adapted to form shoulders $a'$, extending inwardly into the said casing. These shoulders may be in the form of ribs, lugs or any other suitable form of projection.

The sections $a$ are constructed of some non-conducting material, such as hard rubber, indurated fiber, or any other suitable substance which will answer the requirements. They are each preferably provided with an opening $a^2$, which extends into the casing between the shoulders $a'\,a'$. Within the respective sections $a$, and resting against the shoulders $a'$, are plates $b$, of some kind of non-conducting, porous material, preferably unglazed, porous porcelain ware, or similar substance. The porosity of each is sufficient to permit the free circulation of electrolyte fluid and of the passage of an electric current without undue resistance. In the space $a^3$ between the porous plates $b$, and the respective ends of the sections, I place oxide of lead, or other suitable substance commonly known under the head of active material. The respective ends of the casing $a$ are then closed by means of a plate $c$ of lead, or other suitable metal which will resist the action of the electrolyte, said plate being in contact with the active material and joined to the end of the section $a$, by suitable packing material so as to completely close the same and form a tight joint.

Each of the sections $a$ is formed in the same manner, with the exception that one of the plates $b$ is common to both of said sections and forms an intermediate conducting wall between the same, which stops the passage of the electrolyte, but permits a free passage of the electric current. The electrolyte, it should be stated, is placed in the space $a^4$ between the respective porous plates $b$, being inserted through the opening $a^2$, which is then closed in any suitable manner. When a sufficient number of sections are placed together to form the proper potential, the sections are clamped together, preferably by rods or bolts $e$, which pass at each end through suitable end plates $f\,f$, of suitable non-conducting material, which bear against and protect the terminal conducting plates $c'$.

Each of the terminal conducting plates is provided with a suitable binding post, or other connecting device $g$, to which the conductors from the charging device are attached. In charging, the current passes from the positive to the negative pole of the machine, and one of the terminal plates becomes positive and the other negative. The current passes through the respective sections in the series and reduces the active material on opposite sides of the porous plates of each section to oxygen and hydrogen elements in the usual way; the intermediate conducting plates $c$ being simply conducting plates between the respective elements, each of said plates thus forming on one side a positive electrode and on the other side a negative electrode. By having the electrolyte inclosed within the chamber $a^4$ between the porous walls $b$, said electrolyte may be readily removed or inserted, as desired, and at the same time the active material is always retained in its place in contact with the contacting plates. The active material being supported within a chamber formed by the outer casing and the porous and conducting walls, respectively, cannot be displaced and always remains in its proper position. The intermediate conducting plates being arranged between the respective sections, and forming an electrical connection between the same, will not be subject to the electrolytic action, inasmuch as one side of said plate will be positively and the other negatively charged.

If desired, the respective ends of the sections $a$ may be recessed, as shown at $h$ in Fig. 4, to receive the conducting plate $c$, in which case, when the parts are drawn together, the respective sections will constitute a substantially continuous casing.

It is obvious that the shape of the respective sections or of the outer casing may be modified, if desired, without interfering with or changing the operation of the device and without departing from my invention.

Having thus described my invention, I claim—

1. In a secondary battery, an outer casing formed in sections, each of said sections being provided with internally projecting lugs or shoulders, non-conducting porous plates adapted to rest against said shoulders, and a peripheral opening extending through the outer walls of said casing between said porous plates, positive and negative electrodes arranged at and adapted to close the ends of the respective sections, active material between said porous plates and electrodes, and an electrolytic fluid within said casing, substantially as specified.

2. A secondary battery consisting essentially of a series of sections, each of said sections comprising an outer casing, porous division walls in said casing, metallic plates or walls to form positive and negative electrodes at the respective ends of said casing, an electrolytic fluid between said porous walls, active material arranged between the respective porous walls and the electrodes, and means, substantially as described, for connecting said sections together, substantially as specified.

3. The combination of a casing having a peripheral opening, non-conducting porous walls on each side of said opening to form a chamber, an electrolyte in said chamber between said porous walls, active material in the respective ends of said casing and separated from the electrolyte by said porous walls, and positive and negative electrodes in contact with said active material on opposite sides of said chamber, substantially as and for the purpose specified.

4. A sectional battery consisting essentially of an outer casing formed in sections, as described, each of said sections being provided with porous plates or walls arranged on each side of a peripheral opening and adapted to form chambers for the reception of electrolyte and active materal, metallic plates in contact with the active material at or near the ends of said sections, means for connecting said sections together so that the active material of one section will be in contact with the metallic plates of the preceding sections, and means for establishing an electrical connection with the end plates of said series, substantially as specified.

In testimony whereof I have hereunto set my hand this 24th day of January, A. D. 1894.

ELIAS M. POSTON.

Witnesses:
OLIVER H. MILLER,
CHAS. I. WELCH.